Aug. 11, 1953 — W. O. MULLINS — 2,648,440
PROCESS FOR CLEANING FILTER SAND BEDS
Filed Oct. 28, 1949

INVENTOR.
WILLIAM O. MULLINS
BY Jennings & Carter
ATTORNEYS

Patented Aug. 11, 1953

2,648,440

UNITED STATES PATENT OFFICE 2,648,440

PROCESS FOR CLEANING FILTER SAND BEDS

William O. Mullins, Montgomery, Ala., assignor to Wittichen Chemical Company, a corporation of Alabama Application October 28, 1949, Serial No. 124,071

2 Claims. (Cl. 210—130)

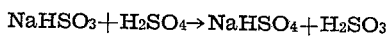

This invention relates to an improved method of cleaning filter sand beds and has for an object to provide such a method which shall be simple and economical and which shall be effective to clean the beds within a minimum of time, thereby avoiding the necessity of taking the filter out of service for an extended period of time.

A further object of my invention is to provide a method of cleaning sand filter beds which shall be particularly adapted for removing manganese and iron compounds from the filter sand.

A still further object is to provide a method of cleaning sand filter beds, which shall also be effective to sterilize the filter.

Heretofore published methods of cleaning filter beds have included the use of sulfur dioxide which is introduced below the filter bed and allowed to flow upwardly through the bed until a suitable concentration of sulfurous acid is obtained in the filter. The water level is then raised above the top of the sand and the solution is allowed to stand for several hours in order to complete the reaction with the foreign matter in the sand bed. I have discovered a method of cleaning sand filter beds whereby a much shorter period of time is required.

In carrying out my improved method I add sodium bisulfite to the water over the sand in the filter and then add approximately twice as much sulfuric acid as is required to react with the sodium bisulfite. The water level in the filter is then lowered to bring the acid and sodium bisulfite down into the sand. This brings about a chemical reaction within the sand bed thereby releasing sulfurous acid and sodium bisulfate in addition to the unreacted sulfuric acid, as follows:

$$NaHSO_3 + H_2SO_4 \rightarrow NaHSO_4 + H_2SO_3$$

Both sodium bisulfite and sulfurous acid have acid and reducing properties and react with the metallic and other impurities in the filter bed to form soluble compounds which are carried away with the wash water. The proportions released are approximately as follows: 1 part sulfurous acid, 1.2 parts sulfuric acid and 1.5 parts sodium bisulfate.

As is well known, sulfurous acid reduces hydrated manganese dioxide to a bivalent manganese which then combines with the oxidized sulfurous ion to give water soluble manganese sulfate. Also, sulfuric acid dissolves ferric hydroxide to form soluble ferric sulfate. While I do not know what chemical reactions take place when sodium bisulfate comes in contact with manganese and iron compounds in the presence of sulfurous acid and sulfuric acid, I do know that the manganese and iron compounds are removed from the sand much faster when sodium bisulfate and sulfurous acid are released concomitantly within the sand, and in the presence of sulfuric acid, than when sulfurous acid alone is used to clean the sand.

The two views in the accompanying drawing show diagrammatically a typical filter embodying a sand filter bed and in conjunction with the following description illustrates the method of carrying out my invention in which.

Figure 2:
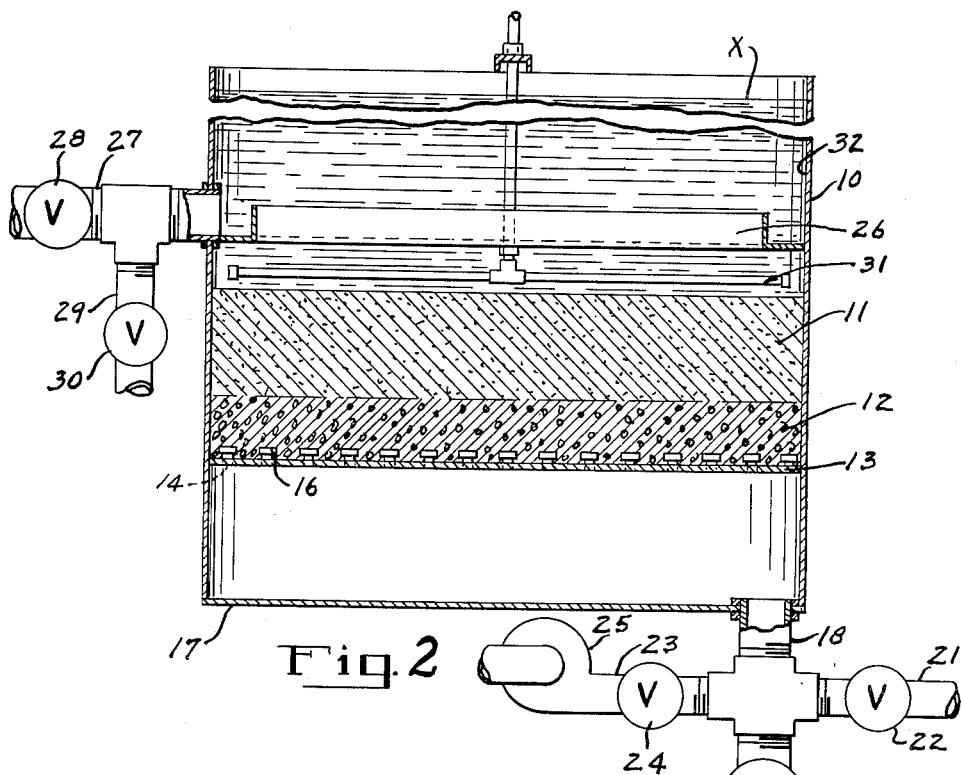
Fig. 2 is a sectional view taken along line II—II of Fig. 1.
Figure 1:
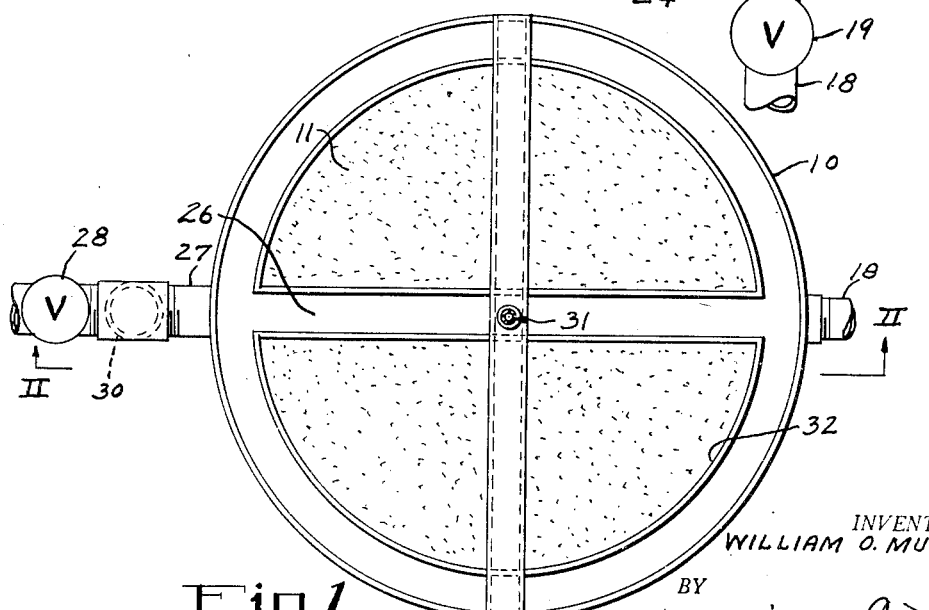
Fig. 1 is a plan view.

Referring now to the drawing, I show a filter receptacle 10 containing a layer of sand 11 and one of gravel 12. Below the gravel is a false bottom 13 having a plurality of holes 14 therein which are covered by strainers 16. The bottom of the receptacle is shown at 17 spaced from the false bottom 13. The filtered water is collected above the bottom 17 and flows therefrom through a pipe 18 having a regulating valve 19 therein. Communicating with pipe 18 and the sewer line is a pipe 21 having a regulating valve 22 therein. Also communicating with the pipe 18 is a pipe 23, having a regulating valve 24 therein and which communicates with the wash water pump 25. In the washing process the water enters the bottom of the filter through pipe 23 and is collected in a trough 26 above the sand 11. The trough is inclined to allow the water to drain away to the sewer through a pipe 27 having a valve 28 therein. Also communicating with pipe 27 is a pipe 29 having a valve 30 therein. This pipe admits the water which is to be filtered.

The filter is first back washed in the usual manner by passing water upwardly through the filter bed, admitting the water through valve 24. After washing, the water is lowered to within approximately one foot of the sand. Anhydrous sodium bisulfite is then spread over the top of the sand 11 with a shovel or by other suitable means as uniformly as possible in the proportion of from 1 to 5.7 pounds of sodium bisulfite per square foot of sand surface area, or 400 to 2000 pounds of sodium bisulfite per million gallons of maximum daily plant capacity depending upon the impurities to be removed. The sodium bisulfite is dissolved and is distributed by agitating the solution as by means of a surface agitator 31, or where surface agitators are not installed, long handle paddles may be used.

Sulfuric acid is then poured slowly into the filter, using 2.8 to 9.8 pounds of sulfuric acid (66° Bé.) per square foot of sand surface area, or 1000 to 3500 pounds of sulfuric acid (66° Bé.) per million gallons of maximum daily plant capacity, depending upon the amount of iron and manganese to be removed from the filter bed. The usual precautions must be exercised in handling the acid. The water is next lowered in the filter to within an inch of the sand by allowing the water to pass out through the regulating valve 22 to the sewer line. The filter is slowly refilled, by means of the wash water pump 25, to a depth of one foot over the sand 11, this procedure is repeated twice. The level of the solution is then raised to the maximum water level, indicated at X, and held for approximately 15 minutes to clean the inner walls 32 of the filter receptacle 10. The filter is then washed until a normal pH value in the water flowing into the wash water trough 26 has been obtained.

While washing the filter an alkali, such as lime or soda ash, is added to the sewer in order to neutralize the water going to waste. This will require from 1000 to 3500 pounds of alkali per million gallons of maximum daily plant capacity or 2.8 to 9.8 pounds of alkali per square foot of sand surface area. The amount of alkali added should be at least equal in weight to the weight of the acid placed on the sand and should be added as uniformly as possible during the first ten minutes of washing the filter.

The sand is examined and if clean, the filter is returned to service after filtering to waste for a few minutes. If the sand is not clean the above process should be repeated.

I wish it to be understood that I do not desire to be limited to the exact details of carrying out my invention as herein described, for obvious modifications will occur to a person skilled in the art.

What I claim is:

1. The method of cleaning a filter sand bed comprising the steps of covering said bed with water, dissolving in said water from 1 to 5.7 pounds of sodium bisulfite per square foot of sand surface area thus forming an aqueous solution of sodium bisulfite, adding sulfuric acid to said solution in an amount equivalent to form 2.8 to 9.8 pounds at 66° Bé. per square foot of sand surface area thus bringing about a chemical reaction, and drawing the solution thus formed down into the sand bed while said chemical reaction is taking place thus concomitantly releasing sodium bisulfate and sulfurous acid within the sand bed.

2. The method of cleaning a sand filter and the walls thereof comprising the steps of covering the filter sand bed with water, dissolving in said water from 1 to 5.7 pounds of sodium bisulfite per square foot of sand surface area thus forming an aqueous solution of sodium bisulfite, adding sulfuric acid in an amount equivalent to from 2.8 to 9.8 pounds at 66° Bé. per square foot of sand surface area thus bringing about a chemical reaction, drawing the solution thus formed down into the sand bed while said chemical reaction is taking place thus concomitantly releasing sodium bisulfate and sulfurous acid within the sand bed, and subsequently raising the level of the solution in the filter to the maximum water level thereof thereby cleaning the inner walls of the filter.

WILLIAM O. MULLINS.

References Cited in the file of this patent

UNITED STATES PATENTS

| Number | Name | Date |
|---|---|---|
| 1,167,700 | Laist et al. | Jan. 11, 1916 |
| 1,897,638 | Hubbell | Feb. 14, 1933 |
| 1,989,789 | Crew | Feb. 5, 1935 |
| 2,069,621 | Patrick | Feb. 2, 1937 |
| 2,266,137 | Westby | Dec. 6, 1941 |
| 2,357,715 | Westby | Sept. 5, 1944 |

FOREIGN PATENTS

| Number | Country | Date |
|---|---|---|
| 505,178 | Great Britain | May 2, 1939 |

OTHER REFERENCES

Inorganic Reactions, Gilman (1929), pub. by Eclectic Publishers, Chicago; page 123 cited.